United States Patent [19]

Sirven

[11] 4,054,277
[45] Oct. 18, 1977

[54] HYDRAULIC SHOCK ABSORBER

[76] Inventor: Jacques Marie Michel Sirven, La Colline rue Francois Leroux, 91400 Orsay, France

[21] Appl. No.: 622,276

[22] Filed: Oct. 10, 1975

[30] Foreign Application Priority Data

Oct. 11, 1974 France .................................. 74.34286

[51] Int. Cl.² .................................................. F16F 9/34
[52] U.S. Cl. ....................... 267/35; 188/276; 188/298; 188/315; 188/318; 188/321; 188/322; 267/65 R
[58] Field of Search .............. 188/322, 276, 280, 281, 188/298, 314, 315, 318, 321; 267/35, 121, 65 R; 137/494

[56] References Cited

U.S. PATENT DOCUMENTS

| 2,035,954 | 3/1936 | Focht | 188/314 |
|---|---|---|---|
| 2,038,032 | 4/1936 | Flynn | 188/314 X |
| 2,774,446 | 12/1956 | De Carbon | 188/269 |
| 2,856,035 | 10/1958 | Rohacs | 188/269 |
| 2,929,471 | 3/1960 | Schnitzer | 188/298 |
| 3,368,807 | 2/1968 | Thrasher | 267/35 |
| 3,376,032 | 4/1968 | Schmid | 267/65 R X |
| 3,425,522 | 2/1969 | Gryglas | 188/315 |
| 3,690,425 | 9/1972 | Willich et al. | 188/321 |

FOREIGN PATENT DOCUMENTS

| 1,081,439 | 6/1954 | France | 188/315 |
|---|---|---|---|
| 18,898 | 1/1966 | Japan | 188/322 |
| 1,226,534 | 3/1971 | United Kingdom | 267/65 R |
| 726,474 | 3/1955 | United Kingdom | 137/494 |

Primary Examiner—George E. A. Halvosa
Attorney, Agent, or Firm—Beveridge, De Grandi, Kline & Lunsford

[57] ABSTRACT

A vehicle shock absorber of the hydraulic cylinder and piston type which includes a control valve for limiting pressure of the hydraulic fluid during compression movement to control the damping force of the device in accordance with rate of compression movement above a predetermined rate. The damping force is limited during expansion movement to provide good road-holding ability for the vehicle.

17 Claims, 5 Drawing Figures

HYDRAULIC SHOCK ABSORBER

BACKGROUND OF THE INVENTION

Field of the Invention

This invention relates to a shock absorber device intended to be placed between a suspended part which may, for example, be made up of the chassis or body of a vehicle and a non-suspended part which may, for example, consist of the wheels of a vehicle. More particularly, this invention relates to a shock absorber of the type shown in my copending application, Ser. No. 578,858, filed May 19, 1975, now U.S. Pat. No. 3,966,030, the disclosure of which is incorporated herein by reference and on which the present application is an improvement.

As stated in the above-mentioned copending application, the selection of the shock absorption value in a hydraulic shock absorber always involves a difficult compromise. It is in effect necessary to limit the shock absorption force during a compression movement of the absorber in such a fashion that an abrupt impact or shock, such as may result from the passage of a vehicle wheel over a bump in the road, will not cause an excessive acceleration of the entire suspended mass, while at the same time providing adequate absorption force for lesser impacts to provide a stable ride. This is accomplished in the shock absorber device disclosed in my above-mentioned patent application which makes it possible to absorb to the maximum extent the oscillations of the suspended mass during compression movements, while at the same time limiting the shock absorption force when the compression movement speed is great, that is to say, for example, when the vehicle wheel encounters a small-dimensioned obstacle which, however, causes an abrupt impact upon the shock absorber. In such a device, the absorption force decreases when the compression movement speed exceeds a predetermined limit value.

The shock absorber disclosed in my above-mentioned patent application is equipped with a control valve capable of establishing fluid communication between two chambers in a cylinder and separted by the main piston which is activated by a rod extending through one of the chambers. The control pressure of the control valve is obtained by restricting the flow to a reservoir of the fluid surplus resulting from the reduction in the useful volume of the cylinder following the penetration of the piston rod into the one cylinder chamber. The control valve can be a small ball or an equivalent element subject to the action of a movable element, such as an additional piston upon which acts a return spring.

When the speed of the rod, during a compression movement, exceeds a predetermined limit value, the differential pressure, acting upon the two faces of the moveable element, increases, and, beyond a predetermined limit value, causes the opening of the control valve which brings about a rapid reduction in the shock absorption force. The hydraulic pressure being exerted upon the movable element and causing the opening of the valve is a function of the displacement speed of the piston during a compression movement. Thus, there is produced an absorption force which is decreased as a function of the piston displacement speed.

In one embodiment described in my above-mentioned patent application, the piston is held by means of an elastic member whereby, when rod displacement speed is very great, the elastic member is initially compressed by the piston movement which brings about an increase in the volume of material submerged in the cylinder, thus bringing about the control of the valve as previously described before the shock absorption force has reached its maximum value.

SUMMARY OF THE INVENTION

It is the primary object of the present invention to provide a shock absorber device which will function according to the principle of the shock absorber in my above-mentioned patent application but which will be simpler and more economical to manufacture and whose features can easily be modified according to the desire of the user.

The shock absorption device according to the present invention involves a cylinder, containing a hydraulic fluid, and a main piston activated by a rod and defining, within the piston, a first and a second chamber, said second chamber containing the rod. A control valve, subject to the action of a return spring is placed in such a manner as to be able to establish fluid communication, during a compression movement of the shock absorber, between the first chamber and an intermediate space which, in turn, communicates with the second chamber containing the piston rod. A fluid tank or reservoir, moreover, is provided and communicates, through a flow restriction, with the above-mentioned intermediate space. The opening of the valve is brought about when the pressure exceeds a limit value in the intermediate space following the increase in the immersed volume of the piston rod during a rapid compression movement. According to the invention, the intermediate space is closed off by a movable element, acting directly upon the control valve and subject to a constant reference pressure. The movable element delimits a reference chamber preferably containing a gas at a constant reference pressure. In one particularly advantageous embodiment, the movable element is a flexible membrane which is incorporated into the valve and which is made of elastic material, for example, metal, gas-proof fabric, or a plastic substance.

In one embodiment, the reference chamber is in contact with the outside atmosphere and the reference pressure is the outside atmospheric pressue and in another embodiment, the reference pressure is other than atmospheric.

The hydraulic fluid tank of the shock absorber in this invention may advantageously contain a gas, which may be separated from the fluid by a flexible membrane or a movable piston. In one preferred version, the shock absorber involves a regulating valve making it possible to vary the pressure of the gas contained in the hydraulic fluid tank which, as described below, makes it possible to regulate the maximum shock absorption force during a compression movement. The tank may be operably connected with the reference chamber so as automatically to compensate for any possible variations in the reference pressure due to the temperature fluctuations.

In another version of the shock absorber according to this invention, the cylinder and the control valve form an assembly arranged inside a cylindrical envelope which is in contact with the hydraulic fluid reservoir by means of a narrow passageway or flow restriction. The assembly made up of the cylinder and the valve is subject to elastic recovery and can be displaced inside said envelope during a compression movement thus causing a variation in the useful volume of the envelope which modifies the valve control pressure and thereby the shock absorption force. This results in a diminution of discontinuities in the shock absorption force, especially during abrupt variations in compression speed. In a variant structure capable of producing the same result, the cylinder and the control valve are fixed in the cylincrical envelope and a resilient block is employed to vary the useful volume of the envelope during a compression movement.

In another embodiment which is particularly well adapted for use in a forward vehicle suspension wherein the shock absorber is placed inside the main suspension spring and acts as directional pivot, sometimes referred to as a Mac Pherson suspension, the shock absorber assembly is mounted so that it will slide in an outside cylindrical element upon which the main suspension spring rests. The shock absorber is attached to the vehicle body by means of a resilient block capable of varying compression movement.

BRIEF DESCRIPTION OF THE DRAWINGS

The invention will be better understood after a study of some special versions described by way of nonrestrictive example and illustrated by the drawings wherein.

DESCRIPTION OF THE PREFERRED EMBODIMENTS

Figure 1:
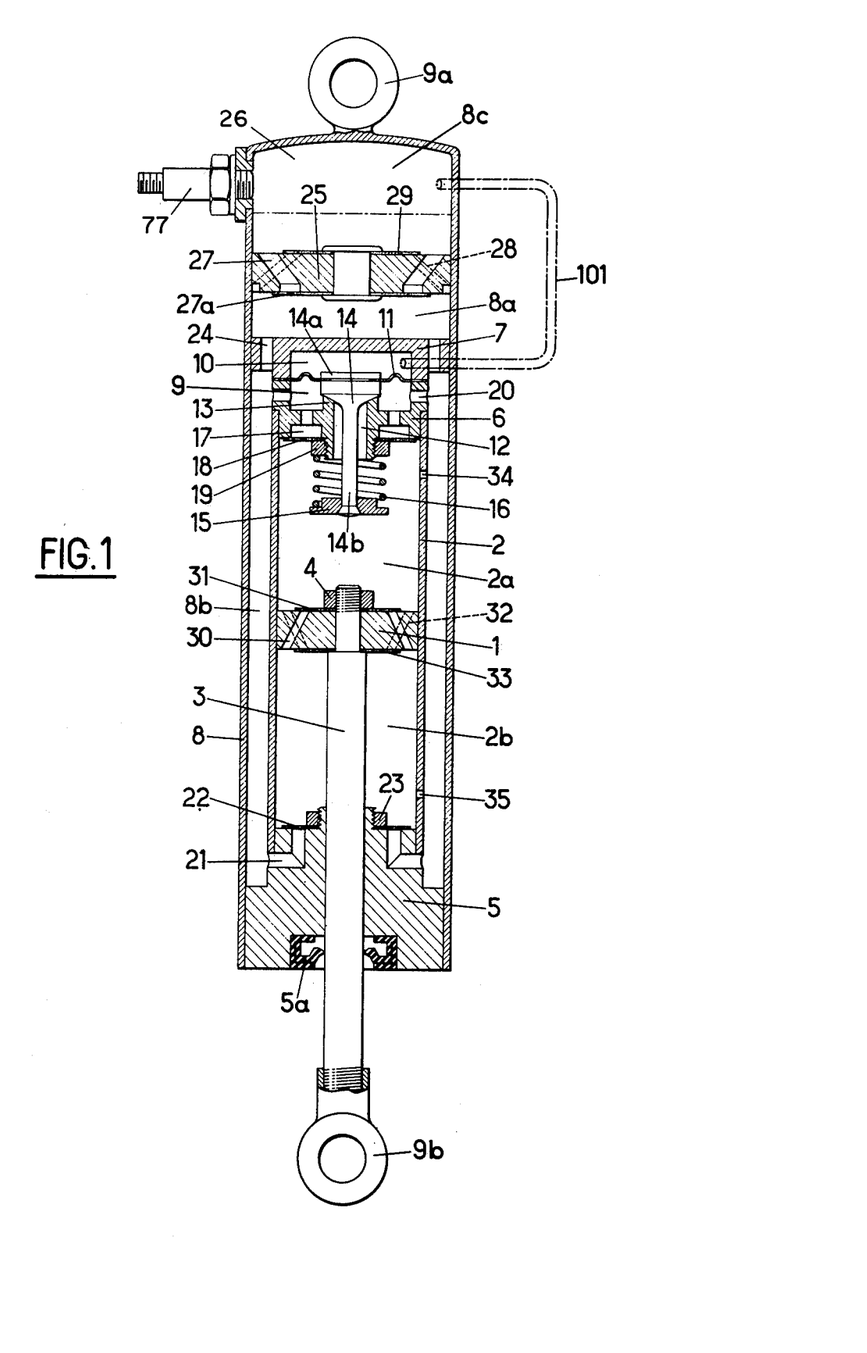
FIG. 1 is a schematic longitudinal section view of a shock absorber according to the invention.

Referring now to the drawings in detail, a shock absorber device according to this invention which can be used especially for an automotive vehicle suspension is illustrated in FIG. 1. The shock absorber comprises a piston 1, which slides inside a cylinder 2 and, within that cylinder, defines a first chamber 2a on the top side of piston 1 (as seen in FIG. 1) and a second chamber 2b on the opposite end of the cylinder, which second chamber encloses the rod 3 which is joined with piston 1, for example, by means of the threaded nut 4. The cylinder 2 is joined, at its lower end, with a closure member or end plug 5 having a central borehole equipped with a sealing ring 5a through which passes piston rod 3. In its upper portion, cylinder 2 is joined to a control valve body 6 on which is attached, by means not shown, an upper closure member or end plug 7.

An outside cylindrical housing 8, concentric with respect to cylinder 2, serves as housing for the assembly of shock absorber elements and is joined at its lower end to the closure member 5 and has the upper closure member 7 joined to its inner surface at a point spaced from the upper end thereof. A mounting ring or eye 9a is attached to the upper portion of housing 8 for joining the assembly to, for example, a vehicle body. A similar mounting adevice 9b is attached to the end of rod 3 projecting out of the closure member 5 to be connected, for example, to a wheel or a suspension arm of a vehicle. The upper portion of housing 8, situated above the upper closure member 7, is separated into two chambers 8a and 8c by a fixed separation partition or wall 25 which is rigidly mounted on the inner wall of housing 8. The upper chamber 8c constitutes a fluid tank, or reservoir, for containing a volume of gas 26 which may be in direct contact with the hydraulic fluid or which may be separated from it by any appropriate means in a manner described hereinbelow.

The control value body 6, with the upper closure member 7, delimits an intermediate fluid chamber or space 9 and a reference chamber 10, separated by a flexible gas-impermeable membrane 11 which is clamped between the opposed adjacent surfaces of valve body 6 and closure member 7. Reference chamber 10 is filled with a gas at constant reference pressure while intermediate space 9 is filled with hydraulic fluid as more fully described hereinbelow.

The valve body 6 has a central bore 12 formed therethrough, terminating at its upper end in a valve seat 13 which cooperates with a generally conical portion of a control valve 14 member. The valve member 14 has an upper head 14a which is joined to the central portion of membrane 11, and a rod or stem portion 14b on its lower end, with the stem extending downward through bore 12 and having mounted on its lower end a disc 15. A spring 16 is positioned between disc 15 and the bottom surface of valve body 6 and normally urges valve 14 downward into contact with valve seat 13. Valve body 6 moreover has passages 17 formed therein for establishing fluid communication between the intermediate space 9 and the first chamber 2a of cylinder 2. A very flexible nonreturn valve 18, retained by means of a screw 19, overlaps the passages 17 at the bottom end thereof and prevents the flow of hydraulic fluid from the first chamber 2a toward the intermediate space 9, while permitting flow from space 9 to the chamber 2a. Valve body 6 also has formed therein radial passages 20, permitting circulation of the hydraulic fluid in both directions between intermediate space 9 and the annular chamber 8b between the outer surface of cylinder 2 and the inner surface of housing 8. Passages 21 formed in the plug 5 provide fluid communication between th chamber 2b and the annular chamber 8b, and a nonreturn valve in the form of a flexible disc 22 retained in position by a nut 23 prevents flow from chamber 2b to chamber 8b while permitting flow in the opposite direction.

The upper closure member 7 has formed therein a plurality of passages 24 establishing free fluid communication between ring-shaped space 8b and chamber 8a.

Separation partition 25 has formed therethrough a number of passages 27 and a nonreturn valve in the form of a flexible disc 27a mounted on the bottom surface of wall 24 prevents fluid flow from chamber 8a to chamber 8c, while permitting flow in the opposite direction. Separation partition 25 furthermore comprises passages 28 cooperating with a rigid nonreturn vlave disc 29 to permit hydraulic fluid circulation from chamber 8a toward chamber 8c. The rigidity of nonreturn valve disc 29 is so selected that, the more the hydraulic fluid flow rate increases in the direction of tank 8c, the more the pressure will increase in portion 8a and hence in intermediate space 9 as will become apparent hereinbelow.

In the embodiment illustrated in FIG. 1, piston 1 has formed therein passages 30 cooperating with a relatively rigid nonreturn valve disc 31 retained on the upper surface of the piston by nut 4 so as to permit limited passage of hydraulic fluid from the second chamber 2b up to the first chamber 2a and prevent any circulation in the opposite direction. Piston 1 also comprises passages 32 cooperating with a relatively rigid non-return valve disc 33 mounted on the bottom surface of th piston to permit limited circulation of hydraulic fluid from the first chamber 2a up to the second chamber 2b and prevent any circulation in the opposite direction.

Calibrated orifices, such as 34 and 35, are provided in the wall of cylinder 2 in the vicinity, respectively, of its lower and upper end portions. As illustrated schematically in broken lines in FIG. 1, the portion of tank 8c containing gas 26 may be connected by means of a pipeline 101 to reference chamber 10.

The operation of the shock absorber as illustrated in FIG. 1 will now be described during a compression movement in the variant not comprising the external conduit 101. The shock absorber is filled with a hydraulic fluid, with the exception of reference chamber 10 and a portion of tank 8c. When the displacement speed of rod 3 is slow, that is to say, when the compression speed is slow, the hydraulic fluid can pass directly from chamber 2a into chamber 2b, in the process going through channels 32 of piston 1, while nonreturn valve 33 is made to open under the action of this slow displacement. The hydraulic fluid can also go throgh the calibrated opening 34 so as to penetrate into ring-shaped space 8b and then return into the second chamber 2b through passage 21 and nonreturn valve 22 and through orifice 35. A portion of the hydraulic fluid, which has penetrated into ring-shaped space 8b, will also flow through passages 24 of member 7 into chamber 8a and on to chamber 8c through passages 28 and nonreturn valve 29. At these slow compression speeds, control valve 14 is kept closed on its seat 13 by the action of its release spring 16.

It should be noted that the existence of the above-mentioned passages 32 and the calibrated opening, such as 34, is optional and that it would be possible to visualize a shock absorber that does not have these elements. In such a shock absorber, no circulation would be possible through piston 1, nor the first chamber 2a in the direction toward the second chamber 2b through the ring-shaped space 8b. The increase in the absorption force would thus take place rapidly. In practice, it is contemplated that either version may be employed to adopt one or the other version, according to the characteristics which are sought for the absorption force corresponding to slow speeds.

Referring again to the shock absorber described in FIG. 1, during a much faster rod compression movement speed, the hydraulic fluid pressure in the first chamber 2a increases until valve 14 is opened. The fluid coming out of the first chamber 2a, through central borehole 12 of valve body 6, traverses the intermediate space 9 and the radial passages 20 and a portion moves into the second chamber 2b, passing through annular chamber 8b and passages 21 of plug 5. The remainder of this hydraulic fluid, corresponding to the increase in the submerged volume of rod 3 in the second chamber 2b, is driven toward chamber 8c through passages 24 and passages 28.

In view of the relative rigidity of return valve 29, the hydraulic fluid pressure increases in the intermediate space 9 as the hydraulic fluid flow rate increases toward chamber 8c. This hydraulic pressure in intermediate space 9 acts upon flexible membrane 11 and tends to further open or to retain open the valve 14 against the force of spring 16. Under these conditions, the pressure decreases in chamber 2a when the compression speed of rod 3 increases beyond a certain speed. From this results a shock absorption force which decreases when the compression speed increases. The limit value of the shock absorption force is determined by the reference pressure of the gas contained in reference chamber 10 since it is the pressure difference between this gas and the hydraulic fluid, contained in intermediate space 9, which brings about the opening of valve 14, producing a movement of flexible memberane 11.

In a modification of the structure shown in FIG. 1, it is possible to provide a simple external regulating device, recognizing that an increase in the pressure of gas 26 contained in chamber 8c, will result in an increase in the pressure of hydraulic fluid upon membrane 11 in intermediate space 9 and, consequently, a diminution of the maximum shock absorption force during a compression movement. It is thus possible to vary this maximum shock absorption force as desired by simply modifying the pressure of gas 26. The portion of chamber 8c, containing gas 26, can thus be placed in contact, through a regulating valve indicated generally at 77, with a pressurizing device, such as a compressor, in order easily to modify the characteristics of the shock absorber.

Moreover, in another variant of the version shown in FIG. 1, it is likewise possible to connect reference chamber 10 to the outside atmosphere, for example, by means of an opening made through the upper closure member 7 and the outside housing 8. Establishing contact between the outside atmosphere and reference chamber 10 will not modify the functioning of the shock absorber, as described earlier, because this functioning rests on the fact that the gas, contained in reference chamber 10, has a constant reference pressure, which for all practical purposes is also the case with outside atmosphere. It is noted that, in such a variant, it is preferable also to connect the portion of tank 8c, in which we find gas 26, with the outside atmosphere so tht the variations in the temperature of the outside atmosphere will not influence the characteristics of the shock absorber.

The variant illustrated schematically in broken lines in FIG. 1 makes it possible to connect the tank 8c and the reference chamber 10 and thus to obtain the same automatic compensation of temperature variations. As illustrated in FIG. 1, the pressure of gas 26 and the reference pressure in chamber 10 balance each other through conduit 101. The shock absorber of course works in the same manner as before.

Figure 4:
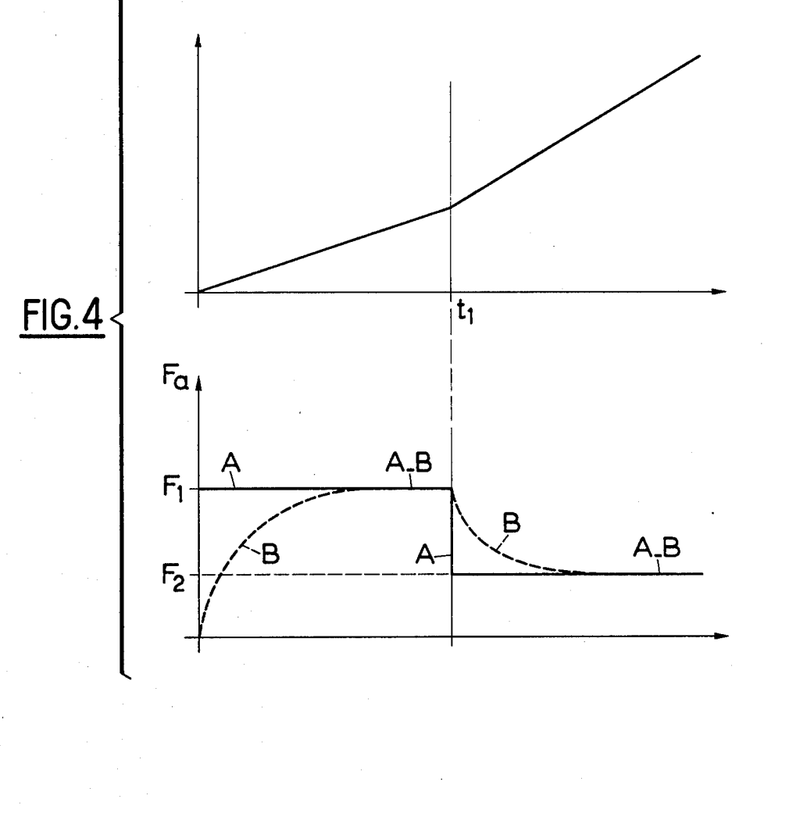
FIG. 4 is a graphic illustration of the variation in the shock absorption force which is obtained when a shock absorber, according to the pesent invention, operates under compression.

FIG. 4 illustrates, by means of a graph, the characteristics which it is possible to attain with a shock absorber as illustrated in FIG. 1 during a compression movement. On the first curve in FIG. 4 is represented the compression displacement of rod 3 of the shock absorber as a function of time. Illustrated on this curve is, by way of example, a displacement of the rod taking place at a constant speed V1 up to time t1, then the displacement speed of the rod increases to a second constant speed V2 which is greater than V1.

The second curve illustrates the corresponding variation of the shock absorption force Fa as a function of the time. Curve A shows such an absorption force obtained by a shock absorber as illustrated in FIG. 1. Thus, the absorption force is F1 for a slow compression speed V1 for which valve 14, illustrated in FIG. 1, has not been activated by the flexible membrane 11. For a compression speed V2 which is greater than a limit value, the shock absorption force declines abruptly and assumes a lower value F2 which results from the opening of valve 14 caused by an increase of pressure in the intermediate space 9 which brings about a displacement of flexible membrane 11.

During an expansion movement, the shock absorber in FIG. 1 functions in the conventional manner. The hydraulic fluid, driven out of the second chamber 2b, can pass directly into the first chamber 2a through passages 30 of piston 1 and nonreturn valve 31. A slight supplementary escape of fluid toward the outside of the second chamber 2b is also accomplished by means of calibrated opening 35, in order to permit the passage of hydraulic fluid toward the annular space 8b. The hydraulic fluid, which has penetrated into annular space 8b, goes through passages 20 of valve body 6, as well as intermediate space 9 and comes out of it through passages 17 and nonreturn valve 18 which permits the fluid to flow into the first chamber 2a. A given hydraulic fluid flow rate, corresponding to the decline in the immersed volume of the rod, is extracted from the fluid tank 8c and goes through passages 27 and nonreturn valve 27a in order to flow into portion 8a. The fluid then goes through passages 24 of upper closure member 7 and into annular space 8b from which it moves toward the first chamber 2a as described previously.

In those uses where it is not necessary to have shock absorption during an expansion movement, it will be understood that it would be possible to make a simple-action shock absorber which would work to absorb loads only upon compression by suppressing any communication through piston 1 as well as calibrated opening 35. The nonreturn valve 18 would also be suppressed and the hydraulic fluid thus permitted to flow freely from the second chamber 2b toward annular space 8b. In this case, the shock absorption force during an expansion movement will depend exclusively on the rigidity of nonreturn valve 18. In practice, the valve will be selected relatively flexible, since the fluid is practically not braked during its passage and since the shock absorption during an expanison movement will be weak.

As seen with reference to the curves in FIG. 4, the shock absorption device, as represented in FIG. 1, makes it possible to obtain abrupt variations in the absorption force. In certain uses, it may be necessary, on the contrary, to achieve the progressive establishment of the maximum shock absorption force and a likewise progressive diminution beyond the limit compression speed. The version in FIG. 2, which constitutes a variant of FIG. 1, makes it possible to obtain this result.

Figure 2:
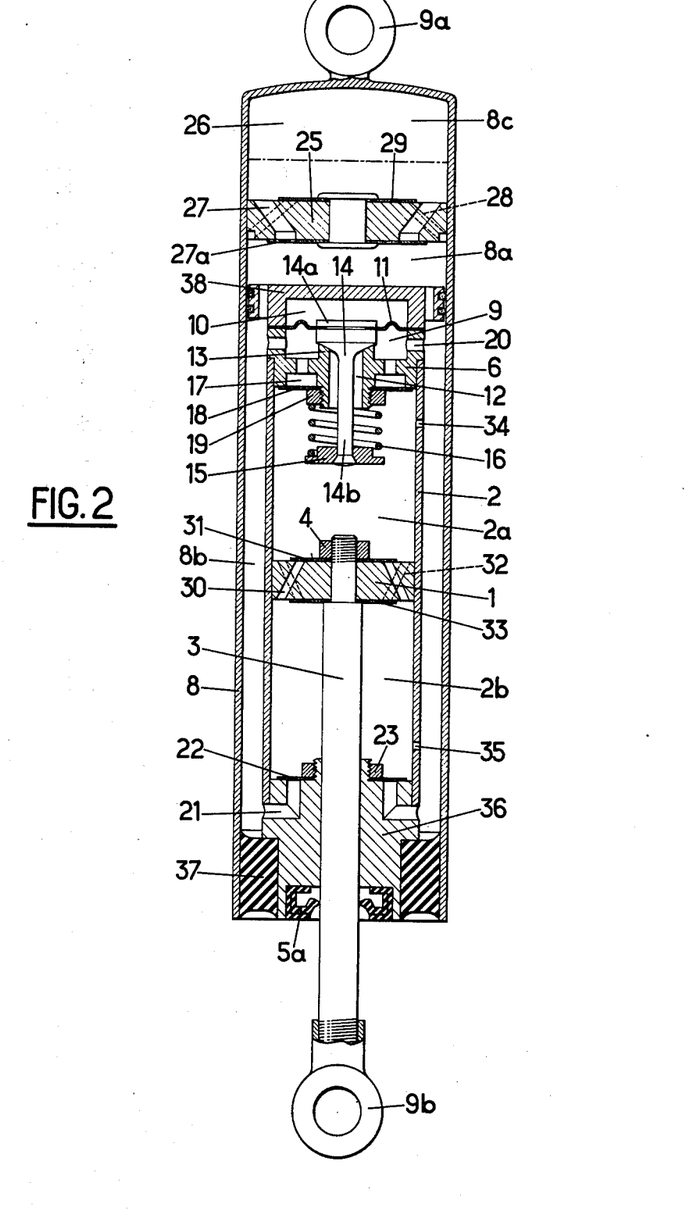
FIG. 2 is a view similar to FIG. 1 and illustrating an alternate embodiment of a shock absorber according to the invention.

In this FIG. 2, elements identical to those in FIG. 1 are given the same reference numerals. The essential difference compared to the version FIG. 1 resides in the fact that the assembly, constituted by cylinder 2 and valve body 6, equipped with control valve 14, can be displaced inside the outside housing 8. For this purpose, the shock absorber has a lower closing piece 36 which is joined to an elastic ring 37 made, for example, of an elastomer substance and attached in fluid-tight relation to the inside wall of outside housing 8 at its lower end. Upper closing piece 38 is in the form of a piston which can slide freely inside housing 8. The elastic ring 37 ensures the elastic recovery of the movement of the assembly of cylinder 2 and of valve body 6, and likewise ensures a sealing action between this movable asembly and the outside housing 8.

The functioning of such a shock absorber, at slow compression speed, is identical to the functioning of the embodiment shown in FIG. 1. When the compression speed is greater, the movable assembly, consisting of cylinder 2, valve body 6, and control valve 14, penetrates inside the outside housing 8, which brings about a reduction in the useful volume of said housing. From this results a hydraulic fluid circulation through passages 28 and valve 29 toward tank 8c. However, the flow rate toward tank 8c cannot exceed a limit value corresponding to a pressure in intermediate space 9 which brings about the opening of control valve 14 and the diminution of the absorption force as described above. Elastic ring 37 thus prevents the rapid establishment of the absorption force because a rapid increase in this force brings about a deformation of elastic ring 37, that is to say, a large hydraulic fluid flow rate in the direction toward tank 8c. As discussed above, the pressure acting in the intermediate space 9 upon flexible membrane 11, in order to bring about the opening of control valve 14, depends on the hydraulic fluid flow rate in the direction toward tank 8c. An increase in the deformation of the elastic ring 37 thus brings about the opening of control valve 14.

In the same manner, an increase in the compression speed cannot bring about an abrupt decline in the shock absorption force as had been the case in the version in FIG. 1. In effect, such an abrupt decrease in the shock absorption force would lead to the contraction of elastic ring 37, hence, an abrupt decline in the flow rate toward tank 8c. Such a decline in the flow rate, in turn, would bring about a diminution in the pressure in intermediate space 9, resulting in the closing of control valve 14 and an increase in the shock absorption force.

Finally, it is pointed out that the shock absorption force as a function of the time can be represented by curve B in FIG. 4 which shows a slowed-down establishment of the shock absorption force during discontinuities in the displacement speed of the rod during a compression movement. Elastic ring 37 does not modify the value of shock absorption forces F1 or F2 when the compression speed is constant. It only diminishes the effect of movement discontinuities. It should be noted, furthermore, that the action of elastic ring 37 must not be compared to that of an elastic connection outside the shock absorber, such as are found in numerous devices presently known, because the deformation of elastic ring 37 brings action upon the control pressure in the intermediate chamber 9 and the controlling of control valve 14.

During an expansion movement, the operation of the shock absorber illustrated in FIG. 2 is comparable to that of the shock absorber in FIG. 1. It is noted, moreover, that the remarks made with regard to the possible variants of the version in FIG. 1 can also be applied to the version in FIG. 2. Thus, for example, it may be desirable to make a simple-effect shock absorber by suppressing the nonreturn valve 22 or by varying the pressure of gas 26

Moreover, it is understood that the elastic ring 37 could be arranged differently in the absorber; it could, for example, be replaced by an elastic element arranged between upper closing piece 38 and separation partition 25, a sealing device being placed between the lower closing piece 36 and the inside wall of housing 8.

The shock absorbers described with reference to FIGS. 1 and 2 comprise a structure adapted to the mounting of the shock absorber, where piston rod 3 is directed downward so that gas 26, situated in fluid tank 8c, can occupy the upper position of the shock absorber. Of course, the invention is not limited to this type of shock absorber and the version in FIG. 3, by way of example, illustrates a variant of a shock absorber according to the invention where piston rod 3 is directed toward the top. To prevent the gas, contained in the fluid tank, from being mixed with hydraulic fluid, it is possible to provide a flexible membrane or a sliding piston which would separate the gas from the hydraulic fluid. One can also visualize modifying the shape of the tank, by arranging it, for example, in a supplementary ring-shaped housing surrounding the shock absorber.

Figure 3:
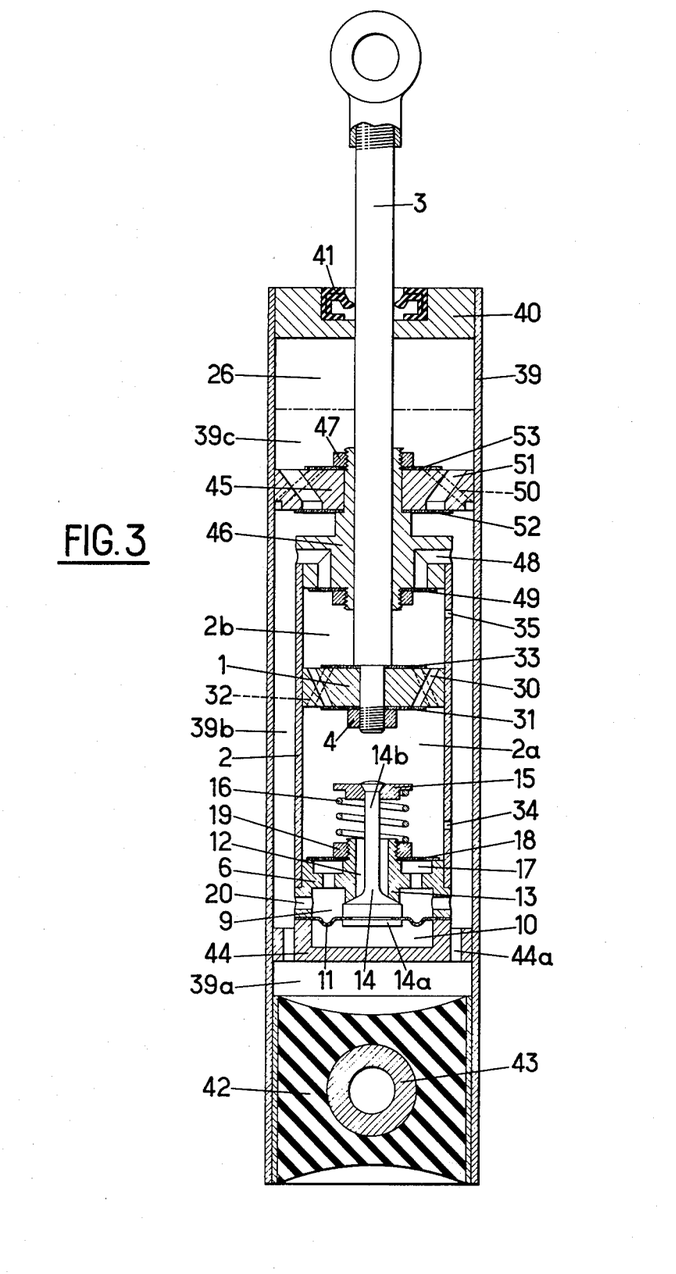
FIG. 3 is a schematic view, in section, of a third version of a shock absorber according to the invention.

The variant represented in FIG. 3 illustrates another version where the placement of the fluid tank has been modified inside the shock absorber and which, furthermore, makes it possible to obtain results similar to those in the version in FIG. 2, although by slightly different means. As represented in FIG. 3, the shock absorber comprises an outside cylindrical housing 39, open at both ends and comprising, at its upper portion, a closing cap 40, equipped with a seal 41, permitting the sealed passage of rod 3 of piston 1. The bottom portion of the outside housing 39 is occupied by a resilient elastomer block 42 which is firmly joined to the inside wall of housing 39 and supports a mounting eye device 43.

The shock absorber elements in FIG. 3, which are identical to those of the shock absorbers in FIGS. 1 and 2, have been assigned the same reference numerals. Thus, the piston 1 slides inside cylinder 2, which has rigidly joined thereon the valve body 6, including control valve 14. These elements are arranged in the same orientation relative to rod 3 and thus appear in an inverted position in FIG. 3 as compared to FIGS. 1 and 2. A ring-shaped space 39b, similar to annular space 8b in the preceding figures, is limited downward by a lower closure member 44 which is mounted within housing 39 and corresponds to closure member 7 in FIG. 1. Member 44 defines a reference chamber 10 and supports flexible membrane 11, inserted between valve body 6 and member 44. The member 44 has formed therein passages 44a providing fluid communication between ring-shaped space 39b and space 39a limited by the upper face of elastic block 42 which acts as a seal.

Ring-shaped spaced 39b is limited in its upper portion by a separation partition 45 connected to an upper closure member 46 having a central bore extending therethrough through which slides rod 3. A nut 47 permits the attachment of the separation partition 45 upon the upper closure member 46. The latter has formed therein passages 48 cooperating with a flexible nonreturn valve disc 49 and these passages play a role similar to those of passages 21 and nonreturn valve 22 in FIGS. 1 and 2, permitting the passage of the hydraulic fluid only from ring-shaped space 39b toward the second chamber 2b of cylinder 2 which contains rod 3.

In the same manner, separation partition 45 has formed therein a plurality of passages 50 which cooperate with a flexible nonreturn valve disc 52 and passages 51 cooperating with a relatively rigid nonreturn valve disc 53 which permits, respectively, circulation in one direction only between ring-shaped space 39b and hydraulic fluid tank 39c in the upper portion of the shock absorber. Moreover, due to the rigidity of valve 53, a braking action or flow restriction is produced upon the fluid flowing into tank 39c. Gas 26, contained in tank 39c, which is traversed by rod 3, can be in free contact with the hyraulic fluid due to the particular configuration of the shock absorber described.

This shock absorber works in substantially the same manner as the one described in reference to FIG. 2, while elastic block 42, during an abrupt compression, brings about a diminution in the useful volume of space 39a and thus an action upon control valve 14. The main difference between the version in FIG. 2 and the version in FIG. 3 resides in the fact that, in the latter, cylinder 2 remains attached in the outside envelope, while the volume variation is obtained by means of a deformable wall consisting of block 42.

It is noted that housing 39, in one variant, could be limited by a rigid bottom member carrying an attachment element in which case the shock absorber works in the same manner as in FIG. 1. Moreover, the different variants listed during the description of the shock absorber represented in FIG. 1 can be applied without difficulty to the shock absorber in FIG. 3. It is thus possible to modify the position of the tank and especially to use a tank separated from the shock absorber per se.

Figure 5:
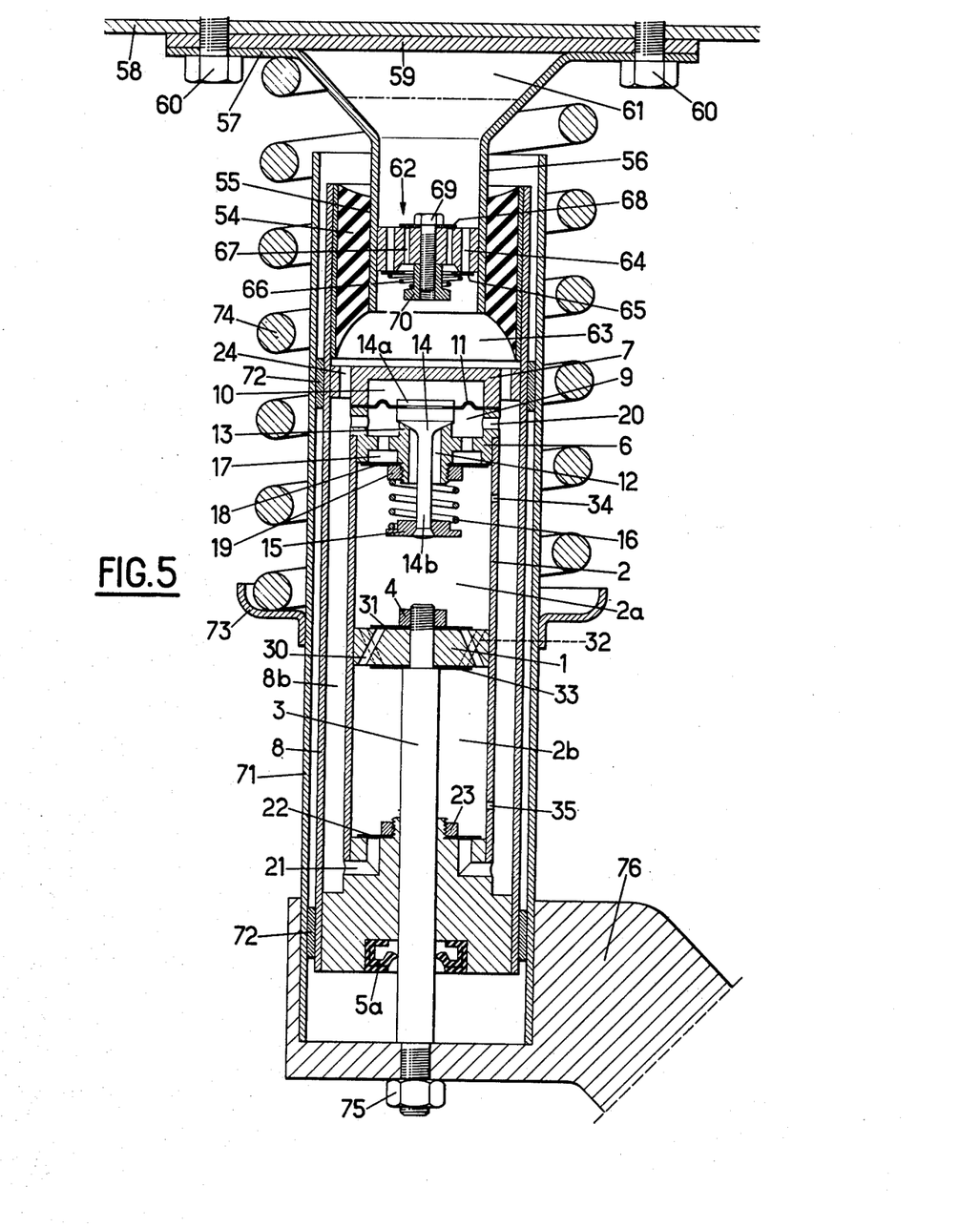
FIG. 5 is a schematic section diagram of a fourth version of a shock absorber according to the invention.

A shock absorber according to this invention is well adapted for use in an automotive vehicle suspension in which the shock absorber is placed inside and concentrically with respect to the main coil suspension spring. This type of suspension is commonly referred to as a Mac Pherson suspension. FIG. 5 illustrates a further embodiment shock absorber according to the invention, which is especially adapted to such a Mac Pherson suspension and in which the shock absorber is placed with the rod downward as in the version in FIGS. 1 and 2. Identical parts have been given the same reference numbers as on the preceding figures. As seen in FIG. 5, this shock absorber is slightly modified with respect to the implementation shown in FIG. 1. The outside cylindrical housing 8 is, in effect, in this version, closed at its upper portion by a block of elastomer material 54 which is joined to the inside wall of housing 8 and which presents a central borehole 55 inside of which there is attached a cylindrical sleeve 56 which widens toward the top and in its upper portion presents an attachment clamp 57 through which sleeve 56 can be attached to an automotive vehicle body 58 with the interposition of closure plate 59 and by means of screw 60.

Sleeve 56 constitutes the tank of the shock absorber and in its upper portion contains a gas 61.

A partition element 62, which performs the same function as the separation partition 25 in the version in FIG. 1, is attached to the inside of sleeve 56 and has the purpose of separating the upper portion 63 of the cylindrical housing 8 and the tank consisting of sleeve 56. Element 62 has formed therein a plurality of essentially axial passages 64 which can be closed off by an elastic round disc 65 acting as nonreturn valve and normally retained in contact with the bottom surface of element 62 by a spring 66 so as to permit the circulation of hydraulic fluid from the tank to the upper portion 63 which communicates with ring-shaped space 8b through passages 24 in closure member 7. Element 62, furthermore, has formed therein a plurality of essentially axial passages 67, cooperating with a relatively rigid nonreturn valve disc 68, to permit circulation of hydraulic fluid in the opposite direction. The relative rigidities of nonreturn valves 65 and 68 are selected in the same manner as for the version in FIG. 1 regarding valves 27a and 29.

A bolt 69, traversing separation element 62 and cooperating with a nut 70, keeps valve 68 and valve 69 in a suitable position by means of spring 66.

Outside cylindrical housing 8 can slide and turn freely inside an outside cylindrical element 71 by means of anti-friction rings 72 made of bronze, for example and fixed to the outside housing 8. Near the median portion of element 71, is mounted, by means of a lug, not illustrated, a supporting flange 73 which receives the main suspension spring 74 which in turn rests in its upper portion upon vehicle body 58 by means of clamp 57. Rod 3 of the absorber is attached, in its lower portion, by means of a nut 75 to an element 76 which is joined with the front journal of the vehicle, not shown.

During action upon the direction of the vehicle, the outside element 71, which is connected to element 76, can thus turn freely by means of rings 72 around the outside housing 8 of the shock absorber which act as pivots. The shock absorber, furthermore, works in substantially the same manner as in the earlier described versions and especially the version in FIG. 3, while elastic block 54, during an abrupt compression, brings about a decrease in the useful volume of space 63 and thus action upon control valve 14 in the same manner as before.

The description of a certain number of special versions does not limit this invention; the expert will understand in particular that one could perfectly replace flexible membrane 11, which makes it possible to act upon control valve 14, by means of a piston sliding inside reference chamber 10. One could also visualize filling the reference chamber 10 with a flexible alveolar material limited by a gas-tight wall.

This invention can be used in any shock absorber device for vehicles or other members subject to abrupt shocks. The shock absorber in the invention makes it possible to control the speed of establishment of the force and there are some interesting uses for it in the buffers of railroad cars, the brakes of artillery pieces, aircraft landing gears, etc.

While I have disclosed preferred embodiments of my invention, I wish it understood that I do not intend to be restricted solely thereto but rather that I intend to include all embodiments apparent to one skilled in the art and which come within the spirit and scope of my invention.

I claim:

1. A shock absorber device comprising a cylinder containing a hydraulic fluid; a main piston located in and dividing said cylinder into a first chamber and a second chamber, a rod connected to said piston and extending through said second chamber for actuating said piston in said cylinder; means defining an intermediate space; means external to said first chamber for providing fluid communication between said intermediate space and said second chamber; a spring biased control valve coupling said first chamber and said intermediate space and responsive to the pressure of the fluid in said first chamber to establish fluid communication between said first chamber and said intermediate space during compression movement of the shock absorber device; means defining a hydraulic fluid reservoir; flow restriction means providing fluid communication between said hydraulic fluid reservoir and said intermediate space and including valve means dividing said hydraulic fluid reservoir into first and second parts; said valve means increasing the fluid pressure in said intermediate space when the fluid flow rate increases therethrough; a movable wall member defining one wall of said intermediate space and integrally connected to said control valve such that movement of said wall member causes a corresponding opening of said control valve in response to increase of the pressure in said intermediate space during rapid compression movement of the shock absorber; and means including said movable wall member defining a reference chamber containing a gas at a substantially constant reference pressure for urging said movable wall member and said control valve in a direction to close said control valve and thereby stop fluid communication between said first chamber and said intermediate space.

2. The device according to claim 1, wherein said reference chamber is in fluid communicating with outside atmosphere, and wherein said reference pressure is atmospheric pressure.

3. The device according to claim 2, further comprising means connecting said reservoir to atmosphere whereby temperature variations will not influence the characteristics of the shock absorber.

4. The device according to claim 1, further comprising means permitting a limited direct flow from said first chamber to said second chamber during a slow compression movement.

5. The device according to claim 4, further comprising means permitting a limited flow of fluid from said second chamber to said first chamber during an expansion movement.

6. A shock absorber as claimed in claim 1 in which said movable wall member includes a flexible membrane.

7. A shock absorber as claimed in claim 1 further comprising means providing fluid comunication between said hydraulic fluid reservoir and said reference chamber to compensate automatically for any variations in reference pressure due to temperature fluctuatons.

8. A shock absorber as claimed in claim 1 in which said hydraulic fluid reservoir contains a gas.

9. The device according to claim 8, further comprising a movable member in said reservoir separating the gas therein from hydraulic fluid therein.

10. The device according to claim 8, further comprising a regulating valve for varying the pressure of the gas contained in said hydraulic fluid reservoir.

11. In a shock absorber device of the type comprising a cylinder containing a hydraulic fluid, a main piston located in and dividing said cylinder into a first and second chamber, a rod connected to said piston and extending through said second chamber for actuating said piston in said cylinder, an intermediate space, means providing fluid communication between said intermediate space and said second chamber, a spring biased control valve in said first chamber operable during compression movement of the shock absorber device to establish fluid communication between said first chamber and said intermediate space, a hydraulic fluid reservoir, a flow restriction providing fluid communication between said hydraulic fluid reservoir and said intermediate space, said intermediate space having one wall defined by a movable member integrally joined with said control valve, means subjecting said movable member to a substantially constant reference pressure tending to move said movable member and said control valve in a direction to close said control valve and thereby stop said fluid communication between said first chamber and said intermediate space, a cylindrical housing having said cylinder and said control valve therein, the interior of said cylindrical housing communicating with said hydraulic fluid reservoir through said flow restriction and further communicating with said intermediate space, and means mounting said cylinder and said control valve within said cylindrical housing for limited resiliently resistant movement inside said housing during a compression movement of said shock absorber device to thereby produce a decrease in the useful volume of said housing whereby the pressure is increased in said intermediate space to thereby open said control valve.

12. The device according to claim 11, wherein said means mounting said cylinder and control valve is in the form of an elastic ring member connected to said housing ensuring both the elastic return and fluid tightness of the device.

13. In a shock absorber device of the type comprising a a cylinder containing a hydraulic fluid, a main piston located in and dividing said cylinder into a first and second chamber, a rod connected to said piston and extending through said second chamber for actuating said piston in said cylinder, an intermediate space, means providing fluid communication between said intermediate space and said second chamber, a spring biased control valve in said first chamber operable during compression movement of the shock absorber device to establish fluid communication between said first chamber and said intermediate space, a hydraulic fluid reservoir, a flow restriction providing fluid communication between said hydraulic fluid reservoir and said intermediate space, said intermediate space having one wall defined by a movable member integrally joined with said control valve, means subjecting said movable member to a substantially constant reference pressure tending to move said movable member and said control valve in a direction to close said control valve and thereby stop said fluid communication between said first chamber and said intermediate space, a cylindrical housing having said cylinder and said control valve arranged therein in a fixed position, said cylindrical housing communicating with said hydraulic fluid reservoir through said flow restriction and communicating with said intermediate space, and an elastic block mounted in the lower portion of said cylindrical housing, said elastic block being capable of deforming during a compression movement to produce a decrease in the useful volume of said cylindrical housing, whereby the pressure is increased in said intermediate space and said valve is opened.

14. In a shock absorber device of the type comprising a cylinder containing a hydraulic fluid, a main piston located in and dividing said cylinder into a first and second chamber; a rod connected to said piston and extending through said second chamber for actuating said piston in said cylinder; an intermediate space; means providing fluid communication between said intermediate space and said second chamber; a spring biased control valve in said first chamber operable during compression movement of the shock absorber device to establish fluid communication between said first chamber and said intermediate space; a hydraulic fluid reservoir; a flow restriction providing fluid communication between said hydraulic fluid reservoir and said intermediate space; said intermediate space having one wall defined by a movable member integrally joined with said control valve; means subjecting said movable member to a substantially constant reference pressure tending to move said movable member and said control valve in a direction to close said control valve and thereby stop said fluid communication between said first chamber and said intermediate space; a first cylindrical housing having said cylinder and said control valve mounted therein; said first cylindrical housing communicating with said hydraulic fluid reservoir through said flow restriction and also communicating with said intermediate space; a second cylindrical housing adapted to rest upon the main suspension spring of a vehicle; said first cylindrical housing being mounted within said second cylindrical housing for telescoping movement therein; said rod being fixed relative to said second cylindrical housing; and an elastic block mounted in said first cylindrical housing and adapted to be attached to a vehicle body, said elastic block being capable of varying the useful volume of the shock absorber device during a rapid compression movement.

15. The device according to claim 14, wherein said hydraulic fluid reservoir is located between the vehicle body and said elastic block.

16. In a shock absorber device of the type comprising a cylinder containing a hydraulic fluid, a main piston located in and dividing said cylinder into a first and second chamber; a rod connected to said piston and extending through said second chamber for actuating said piston in said cylinder; an intermediate space; means providing fluid communication between said intermediate space and said second chamber; a spring biased control valve in said first chamber operable during compression movement of the shock absorber device to establish fluid communication between said first chamber and said intermediate space; a hydraulic fluid reservoir; a flow restriction providing fluid communication between said hydraulic fluid reservoir and said intermediate space; said intermediate space having one wall defined by a movable member integrally joined with said control valve; means subjecting said movable member to a substantially constant reference pressure tending to move said movable member and said control valve in a direction to close said control valve and thereby stop said fluid communication between said first chamber and said intermediate space; a cylindrical outer casing; said cylinder and control valve being fixedly mounted inside said outer casing with the outer casing having its interior in communication with said hydraulic fluid reservoir through said flow restriction and also with said intermediate space; and a resilient member mounted within said cylindrical outer casing at the end thereof opposite the rod of said shock absorber, said resilient member being adapted for positioning between said casing and the suspended part of a vehicle with which the shock absorber is used and being resiliently deformable to vary the effective volume of the casing during a rapid compression movement exerted through the rod of the shock absorber.

17. The shock absorber as defined in claim 16 in which said hydraulic fluid reservoir is adapted to be fixed to a vehicle body with which the shock absorber is used and disposed between the vehicle and said resilient member.

* * * * *